Patented June 10, 1952

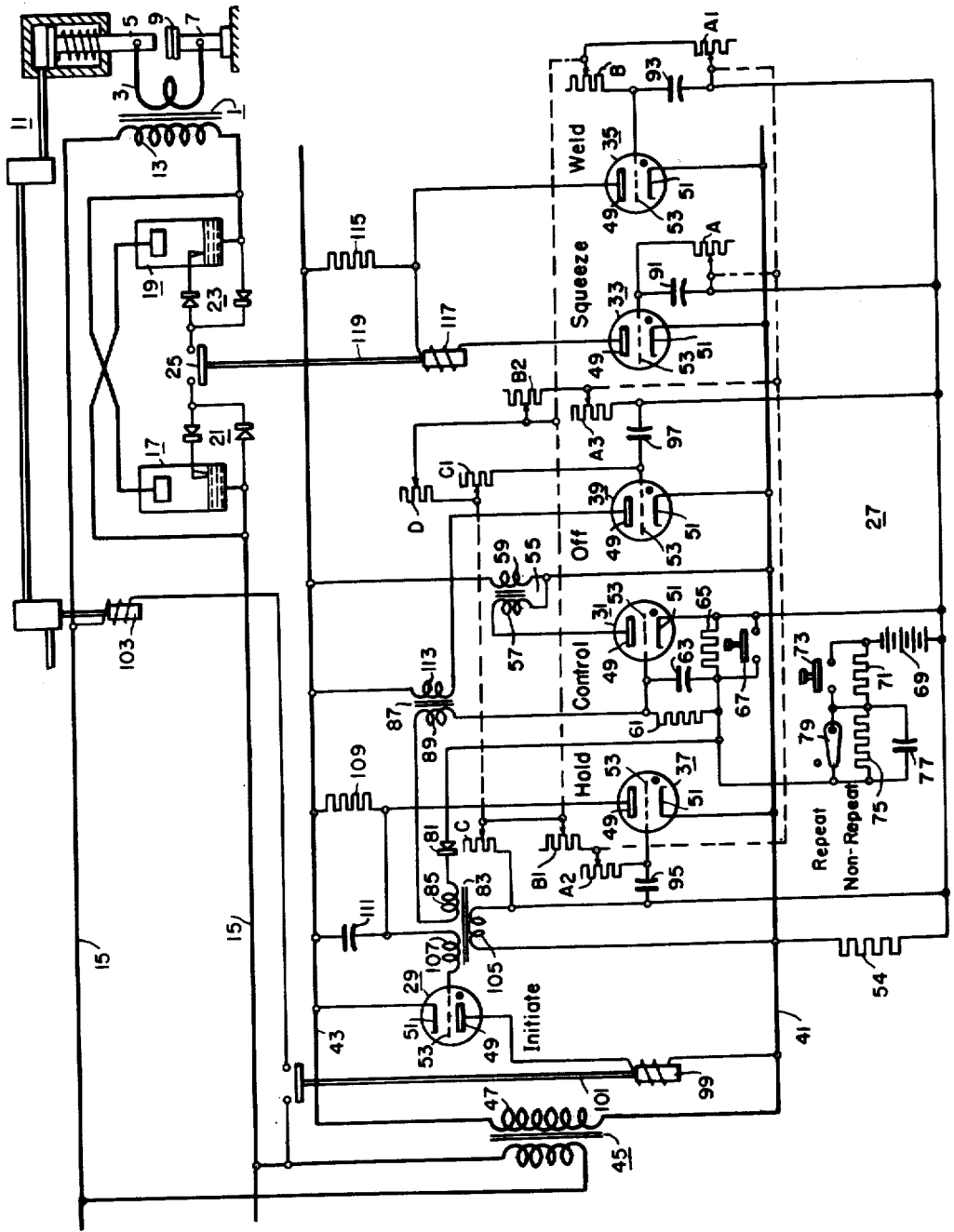

2,600,337

UNITED STATES PATENT OFFICE 2,600,337

ELECTRONIC SEQUENCE TIMER

Clarence B. Stadum, Snyder, N. Y., assignor to Westinghouse Electric Corporation, East Pittsburgh, Pa., a corporation of Pennsylvania Original application July 1, 1949, Serial No. 102,508. Divided and this application April 25, 1950, Serial No. 158,044

11 Claims. (Cl. 315—274)

1

My invention relates to electric discharge apparatus and it has particular relation to apparatus for timing a succession of events, each of which is to persist for a predetermined time interval.

This application is a division of my application Serial No. 102,508, entitled Electronic Sequence Timer, filed July 1, 1949, and assigned to the assignee of the subject application.

My invention has particular application to resistance welding. A resistance welding operation is initiated by the closing of a start switch. After the switch is closed the electrodes are engaged with the work under pressure. This event takes place during a time interval of proper length called the "squeeze" interval. Following the "squeeze" interval, the flow of welding current takes place during an interval which is called the "weld" interval. When the flow of welding current is interrupted, the welding electrodes are maintained in engagement with the material during a so-called "hold" interval until the weld hardens. The electrodes are then disengaged from the material and maintained in disengagement during a so-called "off" interval so that the material may be reset for a second operation. If the welder is set for "repeat" operation and the start switch is maintained closed, the above-described sequence of events is repeated a number of times and a series of welds are produced. If the welder is set for "non-repeat" operation, the start switch must be reopened and reclosed after the completion of each "hold" interval.

Each of the events of a welding or similar operation must occur promptly and precisely in its turn and its duration must be maintained within narrow limits. If, for example, the "weld" interval is initiated before the "squeeze" interval is completed, the material to be welded is burned by the premature discharge between the electrodes. If the "weld'" interval is too long, the material may be burned; if it is too short, a secure joint may not be effected. If the "hold" interval is terminated prematurely, the welding electrodes in opening draw the soft welded buttons with them and punch a hole in the material. If the "off" interval is terminated prematurely or too late, the welds may be too closely or too remotely spaced. The failure of a timer during one of a series of operations may have serious consequences.

Sequence timers constructed in accordance with the teachings of the prior art in wide use, include a plurality of electric discharge circuits

2 for timing the various events and a plurality of electromagnetic relays actuable by the flow of current through the discharge circuits for producing the desired succession in the actuation of these circuits. These relays are actuated by the current flow through thyratrons. For economy reasons the thyratrons are of low current carrying capacity and the sequence relays are relatively light. The operation of each electromagnetic relay consumes an appreciable time interval. These intervals for the different relays are interposed between each event and the succeeding event, and the speed of operation of a welding system is limited by it. A welder is essentially a machine tool designed for carrying out many operations. The relays in the prior art sequence timer are operated many times and are subjected to unusual wear and tear. Since they are of light construction, the relays soon wear out. In fact, the life of an electromagnetic sequence timer is to a large extent limited by the life of the electromagnetic relay available for sequence timer service.

It is accordingly an object of my invention to provide a timer devoid of sequencing electromagnetic relays for timing precisely the duration and the sequence of a plurality of events.

A more specific object of my invention is to provide a sequence timer devoid of sequencing electromagnetic relays for a welder.

Another specific object of my invention is to provide a purely electronic sequence timer.

A further object of my invention is to provide a welding system including a purely electronic welding contactor cooperatively associated with a purely electronic sequence timer.

Another object of my invention is to provide a purely electronic sequence timer for a welder, which is simple in design and operation.

An ancillary object of my invention is to provide novel electric discharge device circuits, particularly adapted to contribute to reliable sequence timing by purely electronic means.

My invention is based on the broad concept of initiating each of the various functions ("squeeze," "weld," "hold" and "off") by rendering conductive in the proper sequence, an initially non-conductive electric discharge valve (or rendering non-conductive in the same sequence an initially conductive valve). To accomplish this broad objective I provide a system including a single valve for each of the functions. In the control circuit of each valve a time constant network including a timing energy storage device is provided. To simplify the structure and operation of the system, all storage devices are charged simultaneously from a common source and all begin to discharge simultaneously at the beginning of a complete timing sequence operation. These valves are interconnected by means devoid of electromagnetic sequencing relays.

The novel features that I consider characteristic of my invention are set forth with particularity in the appended claims. The invention itself, however, both as to its organization and method of operation, together with additional objects and advantages thereof, will best be understood from the following description of a specific embodiment when read in connection with the attached drawing, which is a schematic diagram showing a preferred embodiment of my invention.

The apparatus shown in the drawing comprises a welding transformer 1 across the secondary 3 of which welding electrodes 5 and 7 are connected. One of these electrodes 5 may be moved into and out of engagement with the work 9 by operation of a hydraulic system 11. Power is supplied to the primary 13 of the transformer 1 from buses 15, which may be the buses of a commercial supply of 200 to 2300 nominal voltage rating, through a pair of ignitrons 17 and 19 reversely connected in parallel between one of the buses 15 and the primary 13. Firing circuits 21 and 23 respectively are provided for the ignitrons. These circuits are normally open but may be closed by the operation of a contactor 25.

The operation of the welding electrodes 5 and 7 and the supply of welding current is controlled from a sequence timer 27 devoid of sequencing electromagnetic relays. This timer determines the duration and the order of occurrence of the "squeeze," "weld," "hold" and "off" intervals. It includes electric discharge devices 29, 31, 33, 35, 37, 39 for "initiate," "control," "squeeze," "weld," "hold," and "off" functions, respectively. These electric discharge devices are supplied from auxiliary buses 41, 43 which are energized from the secondary 47 of a transformer 45 which is in turn energized from the main buses 15. The electric discharge devices may be of any suitable type, for example WL2050, having an anode, a cathode and a control element but are preferably thyratrons.

The electric discharge device 31 which I shall call the control tube, has its cathode 51 connected through a charging resistor 54 to the first auxiliary bus 41, and its anode 49 connected in series with the secondary winding 57 of a first transformer 55, to the first auxiliary bus 41. The primary winding 59 of the first transformer 55 is connected across the auxiliary buses 41, 43. Grid bias for the control tube 31 is obtained through various combinations of three circuits. The first circuit may be traced from the grid 53 of the control tube through a paralleled resistor 61 and capacitor 63 which is in series with paralleled resistor 65 and momentary contact type switch 67, to the cathode 51. The second circuit may be traced from the cathode side of the switch 67 through a battery 69, positive to negative, through a resistor 71 which is shunted by the momentary contact type foot switch 73, through the parallel combination of a resistor 75 and capacitor 77 which is shunted by a switch 79 when the apparatus is on non-repeat operation, to the grid side of the switch 67. The third circuit may be traced from the grid side of the switch 67, through a dry rectifier 81, one of the secondary windings 85 of a three winding transformer 83, and the secondary winding 89 of a second transformer 87 to the grid. In the preferred practice of my invention, I use time constant networks which comprise a capacitor and a resistor connected in parallel because of the simplicity and ready availability of their components. Systems, including time constant networks composed of inductors and resistors or of combinations of inductors, capacitors and resistors, are within the scope of my invention.

The time constant networks of the "squeeze," "weld," "hold" and "off" tubes, each include a control or "true time" potentiometer, which I shall designate A, B, C and D, respectively. Each succeeding network of the timing sequence also includes duplicates of all the potentiometers of the preceding network, connected in series with its "true time" potentiometer. Thus, the "squeeze" network contains potentiometer A, the "weld" network includes potentiometers A1 and B, the "hold" network includes potentiometers A2, B1 and C, and the "off" network includes potentiometers A3, B2, C1 and D. The time constant network of a particular sequence comprises its potentiometers in parallel with a capacitor 91, 93, 95, 97, respectively. The "squeeze," "weld," "hold" and "off" time constant networks are connected in the grid, cathode circuits of their respective tubes, and in parallel across a charging resistor 54. This charging resistor is connected in the anode circuit of the control tube 31, between its cathode 51 and the first auxiliary bus 41. The function of the charging resistor 54 is to charge the time constant network capacitors in parallel by grid rectification in a sense to prevent conduction of the associated tubes. The charging resistor 54 is energized by conduction of the control tube 31. When the "control" tube becomes non-conductive, then all of the parallel networks begin timing out simultaneously. Duplicate potentiometers in the parallel time constant networks are ganged. As a result of this ganging, the "true time" potentiometer can be varied to change the actual time interval of a particular sequence without effecting the actual or "true time" interval of any other sequence.

The cathode 51 of the initiating tube 29 is connected to the second auxiliary bus 43. The anode 49 is connected through the energizing coil 99 of the welder head relay 101 to the first auxiliary bus 43. The welding head relay 101 when energized, closes the energizing circuit of a solenoid valve 103 which is connected across the main supply buses 15. This solenoid valve 103 controls the hydraulic circuit 11 to lower the welding head 5.

The primary winding 105 of the three winding transformer 83 is connected across the charging resistor 54. The other secondary winding 107 of the three winding transformer 83 is connected from the grid 53 of the "initiate" tube 29 to the anode 51 of the "hold" tube 37 and also through the parallel resistor 109 and capacitor 111 to the second auxiliary bus 43. The anode 49 of the "off" tube 39 is connected through primary winding 113 of the second transformer 87 to the second auxiliary bus 43. The anode 49 of the "weld" tube 35 is connected through the coil 117 of the ignitron firing control relay 119 to the anode 49 of the "squeeze" tube 33.

Preparatory to starting the welding operation, the main power supply buses 15 are energized, which energizes the auxiliary buses 41, 43 to apply anode voltage to all of the electric discharge devices in the sequence timer circuit 27. Assuming that the repeat, non-repeat switch 79 is closed for repeat operation, the bias furnished by the battery 69 across the resistor 71 which is in parallel with the foot switch 73 in the grid circuit of the "control" tube 31 is 30 volts negative, which will prevent the "control" tube 31 from conducting. The switch 67 is then operated to momentarily shunt its associated resistor 65 and the 30 volts negative bias contributed by the battery 69, whereupon the "control" tube 31 conducts. Current flowing the anode circuits of the "control" tube 31 energizes the primary winding 105 of the three winding transformer 83, and the charging resistor 54. Current supplied by the secondary winding 85 of the three winding transformer 83 in the grid circuit of the "control" tube 31 is rectified so that a bias of 40 volts positive is supplied to the grid 53 of that tube. The resultant grid bias on the "control" tube 31 is 10 volts positive when the contacts of the switch 67 are opened to return 30 volts negative bias. Thus the "control" tube 31, upon conducting, locks itself in the conducting state.

The other secondary winding 107 of the three winding transformer 83 produces a voltage in the grid circuit of the "initiate" tube 29 which is phased to be negative when the anode voltage of the "initiate" tube is positive. As a result, the capacitor 111 in the grid circuit of that tube is charged by grid rectification to produce a negative bias which prevents conduction.

The voltage across the charging resistor 54, by grid rectification of the "squeeze," "weld," "hold" and "off" tubes, charges the capacitors in the time constant networks associated with those tubes, creating negative bias to prevent conduction.

The operation of the welding sequence is started by closing the foot switch 73, shunting its associated resistance 71 to increase the negative bias supplied by the battery 69 to 50 volts. The resultant grid bias on the "control" tube 31 is now negative, so conduction of that tube ceases. The "control" tube is now locked out, so that the sequence timer is nonbeat. There being no voltage on the charging resistor 54, the capacitors 91, 93, 95, 97 in the time constant networks of the "squeeze," "weld," "hold" and "off" tubes begin to discharge, and thus simultaneously start their timing out function.

The charging voltage supplied to the grid circuit capacitor 111 of the "initiate" tube 29 by the three winding transformer 83 having been removed, that capacitor begins to discharge through its associated resistor 109. When the negative bias on the grid of the "initiate" tube 29 has diminished to a critical magnitude, that tube conducts. Conduction of the "initiate" tube 27 energizes the welding head relay 101 which closes to energize the solenoid valve 103 to admit hydraulic pressure on the welding head 5, which moves down to clamp the workpiece 9.

When the "squeeze" time has expired, the "squeeze" tube 33 conducts to energize the ignitron firing circuit relay 119, and the ignitrons fire 17, 19 in a manner well known to those skilled in the art, to supply welding current to the load.

At the end of the "weld" time, the "weld" tube 35 conducts, shunting the ignitron firing circuit relay 119 so that it drops out, and the ignitrons 17, 19 cease firing.

The "hold" tube 37 conducts upon expiration of the "hold" time, creating a voltage across the resistor 109 in the grid circuit of the "initiate" tube 29. This voltage negatively charges the capacitor 111 which is associated with the said resistor 109 by grid rectification. The negative bias on the grid of the "initiate" tube 29 terminates its conduction so that the welding relay 101 is deenergized to raise the welding head 5.

Upon expiration of the "off" time, the "off" tube 39 conducts to energize the primary 113 of the transformer 87 in its anode circuit. The secondary 89 of this transformer contributes sufficient voltage to charge the grid circuit capacitor 63 of the "control" tube 31 to 60 volts positive in approximately one cycle. The resultant grid bias on the "control" tube is now 10 volts positive, so the "control" tube again conducts, and in approximately one cycle, the time constant network capacitors regain their negative charges to stop their associated tubes from conducting.

The transformer 87 in the anode circuit of the "off" time tube 31 is deenergized when that tube ceases to conduct. The 60 volts positive bias contributed by that transformer in the grid circuit of the "control" tube 31 is removed, so that negative bias contributed by the battery 69 again controls, and the tube 31 ceases to conduct. Cessation of conduction of the "control" tube removes the voltage on the charging resistor 54, and the entire welding sequence repeats in the same manner as has been previously described, for as long as the foot switch 73 is closed.

If the foot switch 73 is open at the end of the "off" time, then the negative bias contributed by the battery 69 is only 30 volts, making the resultant bias zero volts. With a bias of zero volts, the "control" tube 31 continues to conduct and the sequence is not repeated.

For non-repeat operation, the repeat, non-repeat switch 79 is open. In this condition, the battery contributes 20 volts negative bias. Then at the end of the "off" time, if the foot switch 73 is open, there is only 20 volts negative bias opposed to the 40 bolts positive bias contributed by the transformer winding 105 in the anode circuit of the control tube. The resultant bias is positive so the "control" tube 31 continues to conduct and the sequence does not repeat. When the foot switch 73 is closed, there is a transient negative bias of 50 volts in the battery circuit. This bias is sufficient to render the "control" tube 31 non-conductive, so that a welding sequence follows. If the foot switch 73 is closed when the "off" time expires, the battery circuit contributes 30 volts negative bias, which is not sufficient to cause the "control" tube 31 to cease conducting, so the sequence does not repeat.

Although I have shown and described certain specific embodiments of my invention, I am fully aware that many modifications thereof are possible. My invention therefore is not to be restricted except insofar as is necessitated by the prior art and by the spirit of the appended claims.

I claim as my invention:

1. In combination, an electric discharge device having at least an anode, a cathode, and a control element, biasing means for maintaining said discharge device normally non-conducting, means, cooperative with said biasing means, for rendering said device conductive and means responsive to the anode current through said device and operable in the control element circuit of said device for maintaining said discharge device conductive after said rendering means becomes ineffective.

2. The combination comprising an electric discharge device having an anode, a cathode and at least one control element, biasing means for maintaining said discharge device normally non-conductive, means cooperative with said biasing means for rendering said device conductive and means including a transformer responsive to the anode current of said discharge device for maintaining said discharge device conductive when said rendering means becomes ineffective.

3. The combination comprising an electric discharge device having an anode, a cathode, and a control element; a transformer having a primary winding and a secondary winding, the primary winding of said transformer being connected in the anode circuit of said discharge device; biasing means for maintaining said discharge device normally non-conductive, said biasing means being connected in a series circuit with said transformed secondary winding between the cathode and the control element of said discharge device; and manually operative means for effecting said biasing means to render said discharge device conductive.

4. In combination, a first electric discharge device having an anode, a cathode, and a control element; first biasing means for maintaining said first discharge device normally non-conductive; means responsive to the conduction of said first discharge device for overcoming said first biasing means to maintain said first discharge device conductive; second biasing means for rendering said discharge device again non-conductive after it has been rendered conductive; a second electric discharge device, and means responsive to the conduction of said second discharge device for again rendering said first discharge device conductive.

5. The combination comprising an electric discharge device having an anode, a cathode, and a control element; first bias means connected in circuit with said control element for maintaining said discharge device initially non-conducting; means for momentarily shunting said first biasing means to render said discharge device conducting; second biasing means connected in series with said first bias means; means for energizing said second bias means responsive to conduction of said discharge device; said second bias means being of magnitude sufficient to overcome said first biasing means.

6. The combination comprising an electric discharge device having an anode, a cathode, and a control element; first bias means connected in circuit with said control element for maintaining said discharge device initially non-conducting; means for momentarily shunting said first bias means to render said discharge device conducting; and second bias means including a transformer having a primary winding and a secondary winding, the primary winding of said transformer being connected in the anode circuit of said discharge device, the secondary winding of said transformer being connected in series with said first bias means; said second bias means being energized responsive to conduction of said discharge device and having a magnitude sufficient to overcome said first bias means.

7. In combination, a first electric discharge device having an anode, a cathode, and a control element; first biasing means for maintaining said first discharge device normally non-conductive; means for momentarily shunting said first biasing means to render said discharge device conductive; means responsive to the conduction of said first discharge device for overcoming said first biasing means to maintain said first discharge device conductive; second biasing means for rendering said discharge device again non-conductive after it has been rendered conductive; a second electric discharge device; and means responsive to the conduction of said second discharge device for again rendering said first discharge device conductive.

8. The combination comprising a first electric discharge device; a second electric discharge device; each of said discharge devices having an anode, a cathode; and a control element, a transformer having a primary winding and a secondary winding; and biasing means energized by the secondary winding of said transformer, said biasing means being connected in series with said secondary winding between the cathode and control element of said first discharge device, and the primary winding of said transformer being connected in the anode circuit of said second electric discharge, whereby the conduction of said first discharge device is controlled by the conduction of said second discharge device.

9. In combination, a first network including a first electric discharge device having principal electrodes connected in said network so that said device may be maintained in a conductive or non-conductive state in said network; means for maintaining said device in one of said states including timing means which when set is adapted to time the transfer of said device from said one state to the other state; a second electric discharge device; means responsive to said second device for setting said timing means, and means responsive to said second device for thereafter initiating operation of said timing means.

10. In combination, a first electric discharge device having an anode, a cathode, and a control electrode; means cooperative with said control electrode and including a timing network which when set maintains said device in non-conductive condition and after a predetermined time interval renders it conductive; a second electric discharge device; means for maintaining said second device non-conductive in the quiescent state of the combination; means for rendering said second device conductive; means cooperative with said timing means and said second device for setting said timing means when said second device is rendered conductive and means for thereafter rendering said second device non-conductive to initiate the timing of said timing means.

11. An electronic sequence timer including at least one electric discharge device for controlling the sequencing of said timer, said device having associated therewith a timing network which when set times the operation of said device; characterized by a single control discharge device having conductive and non-conductive states connected in circuit with said network; means responsive to said control device when it passes from one state to the other to set said network and means responsive to said device when it passes from said other state to said one state to initiate the timing operation of said network.

CLARENCE B. STADUM.

No references cited.

Notice of Adverse Decision in Interference

In Interference No. 86,521 involving Patent No. 2,600,337, C. B. Stadum, Electronic sequence timer, final judgment adverse to the patentee was rendered June 29, 1956, as to claims 1, 2, and 4.

[*Official Gazette January 22, 1957.*]